United States Patent
Nandakumar et al.

(10) Patent No.: US 9,846,608 B2
(45) Date of Patent: Dec. 19, 2017

(54) PROVIDING APPLICATION OPERATIONAL INSIGHTS TO USERS BASED ON CROWD SOURCED PERFORMANCE METRICS FOR OPERATIONAL STATES

(71) Applicant: CA, INC., New York, NY (US)

(72) Inventors: Vikrant Nandakumar, Thanisandra (IN); Madhusudhan Ganda, Kadapa (IN); Hemanth Kumar Pinninti, Bobbili (IN); Naveen Harry Michael, Vijinapura (IN)

(73) Assignee: CA, INC., New York, NY (US)

( * ) Notice: Subject to any disclaimer, the term of this patent is extended or adjusted under 35 U.S.C. 154(b) by 219 days.

(21) Appl. No.: 14/835,474

(22) Filed: Aug. 25, 2015

(65) Prior Publication Data

US 2017/0060654 A1    Mar. 2, 2017

(51) Int. Cl.
  *G06F 11/00* (2006.01)
  *G06F 11/07* (2006.01)
(52) U.S. Cl.
  CPC ........ *G06F 11/079* (2013.01); *G06F 11/0706* (2013.01); *G06F 11/0751* (2013.01)
(58) Field of Classification Search
  USPC .......................................................... 714/26
  See application file for complete search history.

(56) References Cited

U.S. PATENT DOCUMENTS

| | | | |
|---|---|---|---|
| 2011/0213829 A1* | 9/2011 | Concini | G06F 9/547 709/203 |
| 2012/0185735 A1* | 7/2012 | Sambamurthy | G06F 11/079 714/47.1 |
| 2015/0046757 A1* | 2/2015 | Brew | G06F 11/3452 714/47.3 |
| 2015/0113327 A1* | 4/2015 | Faraj | G06F 11/079 714/37 |
| 2016/0170821 A1* | 6/2016 | Shiralkar | G06F 11/0751 714/37 |

* cited by examiner

*Primary Examiner* — Sarai Butler
(74) *Attorney, Agent, or Firm* — Sage Patent Group (57) ABSTRACT

A method includes performing operations on a processor of an application analysis computer. The operations include receiving reports from user terminals containing identifiers for operational states of an application being processed by the user terminals and containing state performance metrics. Each of the state performance metrics indicates a measurement of performance for a corresponding identified one of the operational states of the application being processed by one of the user terminals. The operations further include, for each of the operational states of the application identified in the reports, generating a rule for acceptable performance of the operational state of the application based on the state performance metrics of the operational state reported by the user terminals. The operations further include storing in a repository the rules associated with identifiers for corresponding ones of the operational states of the application. Related operations by a user terminal are disclosed.

20 Claims, 6 Drawing Sheets

PROVIDING APPLICATION OPERATIONAL INSIGHTS TO USERS BASED ON CROWD SOURCED PERFORMANCE METRICS FOR OPERATIONAL STATES

BACKGROUND

The present disclosure relates to computing systems, and, in particular, to management of application programs processed by user terminals.

Users can install a myriad of different types of application programs (also commonly referred to as "applications" and "apps") on user terminals having widely varying software and hardware characteristics. For example, users can select from among several million different applications available on various application servers for downloading to cellular telephones (sometimes called "smart phones"), tablet computers, laptop computers, and other types of user terminals for processing. Over a billion Apple IOS user terminals and Android user terminals are presently being used throughout the world.

Application operational behavior can be highly unpredictable from a user perspective. An application may appear to be operating incorrectly, responding sluggishly, and/or crashed (e.g., not responding to user input). There are many reasons application operation can become unpredictable. A user may provide erroneous input to the application or may not be able to effectively operate the application. Application operation requires access to resources located on the user terminal and which can also be remotely located in network servers or other networked devices. Other applications executing on the mobile terminal and communication problems can delay or prevent application access to such resources. Moreover, users are able to limit resource permissions of an application, which can further interfere with application operation. Such operational unpredictability detracts from the user's experience and can result in low application usage and poor recommendations to others.

SUMMARY

Some embodiments of the present disclosure are directed to a method of performing operations on a processor of an application analysis computer. The operations include receiving reports from user terminals containing identifiers for operational states of an application being processed by the user terminals and containing state performance metrics. Each of the state performance metrics indicates a measurement of performance for a corresponding identified one of the operational states of the application being processed by one of the user terminals. The operations further include, for each of the operational states of the application identified in the reports, generating a rule for acceptable performance of the operational state of the application based on the state performance metrics of the operational state reported by the user terminals. The operations further include storing in a repository the rules associated with identifiers for corresponding ones of the operational states of the application.

Some other embodiments of the present disclosure are directed to a method of performing operations on a processor of an user terminal. The operations include generating state performance metrics, and communicating the state performance metrics to an application analysis computer via a data network. Each of the state performance metrics indicates a measurement of performance of one of a plurality of operational states of an application processed by the user terminal. The operations further include determining an action responsive to one of the state performance metrics for one of the operational states being determined to violate a rule for acceptable operational state performance of the application, and controlling operation of the application during the one of the operational states responsive to the action.

Other methods, application analysis computers, and/or user terminals according to embodiments of the present disclosure will be or become apparent to one with skill in the art upon review of the following drawings and detailed description. It is intended that all such additional methods, application analysis computers, and/or user terminals be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, applications executed by user terminals can have highly unpredictable operational behavior. Because the unpredictable behavior is oftentimes due to internal resource conflicts within the user terminal, users have no visibility into why an application is performing sluggishly, not responding, and/or appearing to otherwise operate improperly. Some applications may be configured to respond to a transaction taking too long by, irrespective of the underlying cause, displaying a graphical wait symbol or filling in a progress bar, and/or displaying generic statements such as "unable to process a request please try again," "booking failed," "payment unsuccessful," etc. Users may improperly assume that they have entered improper data, improperly operated the application, and/or conclude the application is programmatically flawed. However, the problem may arise due to insufficient or lack of network communication bandwidth between the user terminal and a remote network server, insufficient internal memory, insufficient processor bandwidth, and/or blocked or unavailable access to user terminal resources such as GPS receiver, WiFi transceiver, cellular transceiver, camera, Internet resource, contact information repository, etc. These and other incorrect assumptions by the user detract from the user's experience with application.

Some embodiments of the present disclosure are directed to generating and providing run time contextual insights to users identifying an underlining basis for a problem being experienced by an application executed by a user terminal. Some additional or other embodiments of the present disclosure are directed to triggering remedial actions by the user terminal to attempt to remedy the problem experienced by the application.

Figure 1:
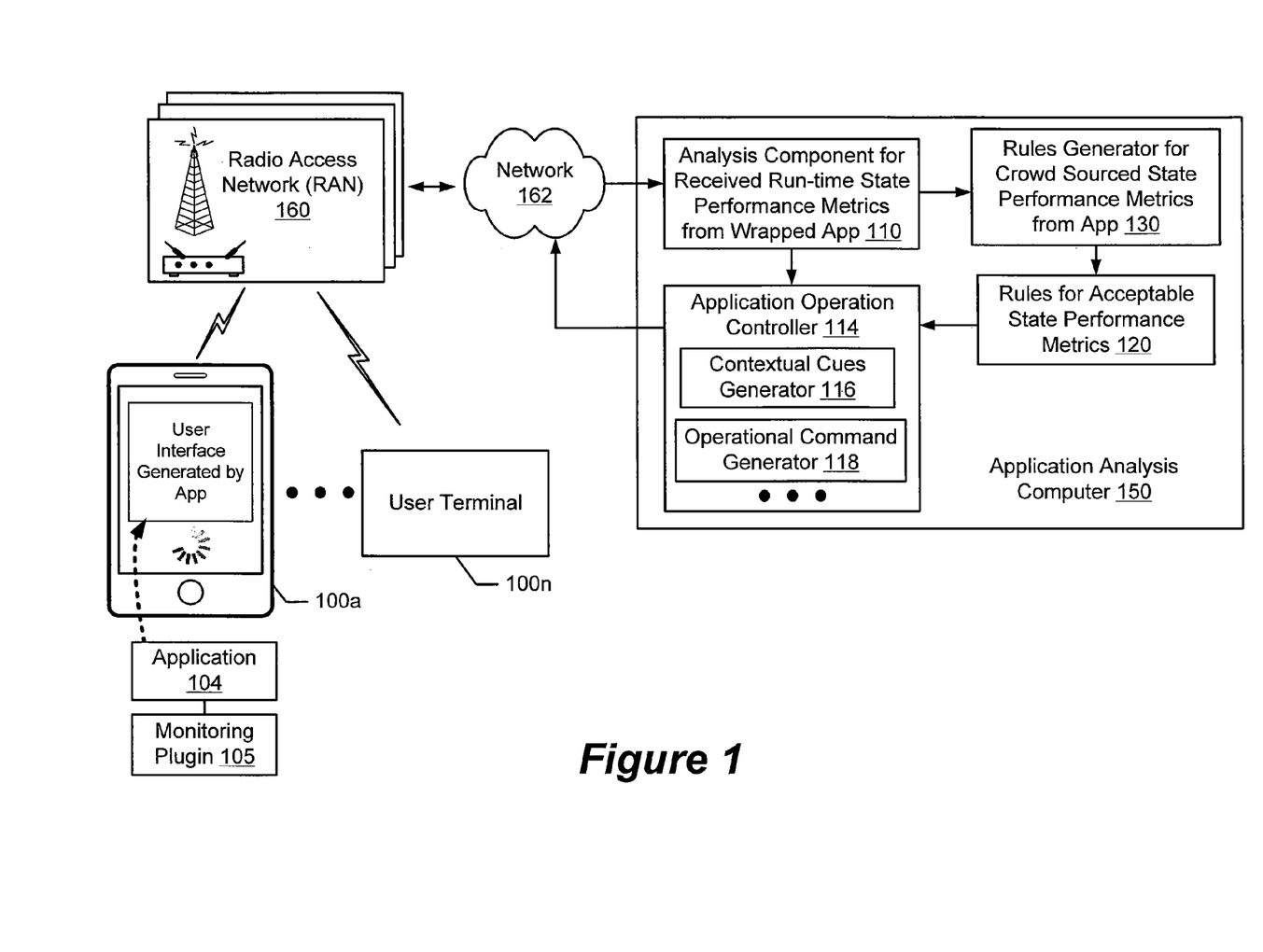
FIG. 1 is a block diagram of a system for generating rules for acceptable state performance metrics from an application based on crowd-sourced metrics and providing contextual insights and/or controlling operation based on the rules, in accordance with some embodiments of the present disclosure.

FIG. 1 is a block diagram of a system for generating rules for acceptable state performance metrics from an application based on crowd-sourced metrics and providing contextual insights and/or controlling operation based on the rules, in accordance with some embodiments of the present disclosure. The system includes user terminals 100a-100n, radio access networks (RAN) 160, and an application analysis computer 150 configured according to some embodiments of the present disclosure. The user terminals 100a-100n can download application programs from an application server. The application server may, for example, include the Apple application store server (e.g., iTunes) and/or one or more of the Android application store server (e.g., Google Play and/or Amazon Appstore). The application programs can include gaming programs, spreadsheet programs, multimedia programs, word processing programs, database programs, presentation programs, etc.

The user terminals 100a-100n may communicate through a wireless and/or wired network connection via a data network 162 with the application analysis computer 150 and the application server. For example, one or more of the user terminals 100a-100n may communicate through the radio access networks 160 using one or more wireless communication protocols that may include, but are not limited to, LTE, WLAN (IEEE 802.11), WiMax, and/or Bluetooth.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein.

The application 104 can include a performance monitoring plug-in 105 that generates state performance metrics. The plug-in 105 can generate each of the state performance metrics to indicate a measurement, performed by the plug-in 105, of performance of one of a plurality of operational states of the application 104 while being processed by the user terminal 100.

Example operational states of the application 104 can include any one or more of a first operational state during which the application 104 requests a present location from a GPS resource of the user terminal 100, a second operational state during which the application 104 requests to access a network node through a WiFi resource of the user terminal 100, a third operational state during which the application 104 requests to access a network node through a cellular resource of the user terminal 100, a fourth operational state during which the application 104 requests to access picture data and/or video data stream from the camera resource of the user terminal 100, a fifth operational state during which the application 104 requests to access contact information data structure residing in a contact information repository resource of the user terminal 100, etc.

The plug-in 105 communicates the state performance metrics to the application analysis computer 150 via the data network 162 and radio access network(s) 160. The state performance metrics can be communicated to the application analysis computer 150 in reports that include identifiers for the operational states of the application 104 being processed by the user terminal 100. In one embodiment, each report contains an identifier for an operational state of the application 104 and a corresponding state performance metric that has been generated by monitoring performance of the application 104 while being processed in that operational state. In another embodiment, each report can contain a plurality of pairs of one of the operational state identifiers and one of the state performance metrics.

The application analysis computer 150 can include an analysis component 110 configured to receive the reports from the user terminals 100a-100n. The reports can contain identifiers for operational states of the application 104 being processed by the user terminals 100a-100n and contain state performance metrics for the identified operational states. The application analysis computer 150 can use the identifier contained in one of the reports for one of the operational states of the application 104 to retrieve a corresponding rule from the repository 120, and use the rule to determine whether it is violated by the state performance metric contained in the report. The user terminals 100a-100n may have different hardware and software platforms, so that the state performance metrics represent cross-platform measurements of the performance of various application operational states. For example, the different user terminal hardware configurations can include different random access memory capacities, different memory space allocations for use by the application, different network communication technologies available for use by the application (e.g., Bluetooth, WiFi, cellular 3G, cellular 4G LTE, etc.), different permission settings for resources are available for use by the application (e.g., contact information repository, GPS location, Wi-Fi transceiver, cellular transceiver, Bluetooth transceiver, front-facing camera, back-facing camera, speaker, microphone, etc.). different user terminal software configurations can include different operating system types and/or versions, different resident applications and/or versions, different sets of presently executing applications, etc. of the user terminals 100a-100n.

In this manner, the application analysis computer 150 can receive reports indicating the measured performance of various defined operational states of the application 104 being processed by numerous different user terminals 100a-100n which may have differing hardware and/or software platform characteristics.

A rules generator 130 generates, for each of the operational states of the application 104 identified in the reports (e.g., first operational state, second operational state, . . . or nth operational state), a rule for acceptable performance of the operational state of the application 104 based on the state performance metrics of the operational state reported by the user terminals 100a-100n. The rules are stored in a rules repository 120 to indicate an acceptable performance of each of the identified operational states of the application 104.

The rules are referred to as crowd sourced because each rule is generated based on state performance metric received from a plurality of user terminals 100a-100n. In some embodiments, the rules may be generated based on state performance metric reported by, for example, thousands or hundreds of thousands of different user terminals. The user terminals 100a-100n can have different users and be operated dispersed across a large geographic region, and can further have different hardware platforms and/or software platforms as explained herein. The state performance metrics can therefore be generated while the various user terminals 100a-100n have different user terminal hardware and software resources available for use by the application 104, and while the user terminals 100a-100n can be using vastly different types and capabilities of communication network to communicate with network resources.

The rules can be generated by the rules generator 130 based on mathematical combinations of the state performance metrics reported by the user terminals 100a-100n. For example, a rule for an acceptable state performance metric for a particular one of the operational states of the application 104 may be generated by mathematically combining the state performance metrics for the operational state to generate a threshold value representing a boundary limit for acceptable performance of the operational state. The mathematical combining may include generating a statistical representation of a boundary identified from the reported state performance metrics for what a reasonable response time is to an API call from the application 104 to a particular type of resource of the user terminal 100. The threshold value can be defined based on the boundary.

In one embodiment, the threshold value represents a maximum wait time the application 104 is to wait to receive a response to an application programming interface (API) call by the application 104 in one of the operational states. In another embodiment, the threshold value represents a maximum latency allowed for a response to be provided to the API call by the application 104 in one of the operational states. In some other embodiments, a first rule identifies a minimum display update rate that needs to be performed by the application 104 during a first one of the operational states without violating the first rule, a second rule identifies a minimum processor bandwidth available for use by the application 104 while operating in a second one of the operational states without violating the second rule, a third rule identifies a minimum memory space available for use by the application 104 while operating in a third one of the operational states without violating the third rule, and a fourth rule identifies a minimum network bandwidth available for use by the application 104 while operating in a fourth one of the operational states without violating the fourth rule.

With continued reference to FIG. 1, the monitoring plug-in 105 generates and reports performance state metrics during execution of the various operational states of the application 104 by the user terminal 100. The monitoring plug-in 105 may be provided by a software development kit (SDK) and inserted within the application 104. The plug-in 105 may be separate from the application 104 and called by programmatic hooks that are inserted into various ones of the operational states of the application while for that are to be measured to generate corresponding state performance metrics.

The monitoring plug-in 105 may intercept or otherwise observe API calls from the application 104 to other applications processed by the user terminal 100, an operating system processed by the user terminal 100, and/or other software/hardware resources of the user terminal 100. As used herein, an "API call" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

The plug-in 105 measures operation of individual ones of a plurality of defined operational states of the application 104 during execution by the user terminal 100, based on the observed API calls from the application 104 to resources of the user terminal 100 and/or based on system events provided by the operating system to the application 104. The plug-in 105 generates state performance metrics based on the measurements. Each of the state performance metrics indicates a measurement of performance of one of a plurality of operational states of the application 104. The plug-in 105 communicates the state performance metrics to the application analysis computer 150 via the radio access network 160 and the data network 162 (e.g., Internet, private network, etc.).

The types of measurements of an operational state of the application 104 that can be performed by the plug-in 105 to generate a state performance metric may include, but is not limited to, any one or more of the following:

1. latency for a response to be provided to an API call by the application 104;
2. an elapsed time waiting without having received a response to an API call by the application 104;
3. application utilization of processor resources of the user terminal 100;
4. application utilization of memory resources of the user terminal 100;
5. rate of information displayed by the application 104 on a display device of the user terminal 100;
6. application utilization of network communication resources of the user terminal 100; and
7. communication latency between the application 104 and another application and/or a network node through a network interface of the user terminal 100.

A state performance metric may identify the measurement value (e.g., latency, elapsed time, and/or resource utilization) and/or may include a screen shot captured from a user terminal display or sub-window associated with the application 104, video captured from the user terminal display or sub-window associated with the application 104, a geographic region of the user terminal 100 while the application 104 is being processed, and/or characteristics of the hardware platform (e.g., processor type, volatile memory space, non-volatile memory space, network interface identification, etc.) and/or software platform (e.g., operating system type and version, identification of resident applications and versions, identification of presently executing applications, etc.) of the user terminal 100.

The application analysis computer 150 can includes an application operation controller 114 that determines when one of the state performance metrics reported by one of the user terminals 100a-100n violates one of the rules in the repository 120 for acceptable operational state performance for the corresponding one of the operational states of the application 104. The application operation controller 114 determines when one of the state performance metrics reported by one of the user terminals (e.g., 100a) violates a rule for acceptable operational state performance of the application 104. The application operation controller 114 communicates a response message to the one of the user terminals (e.g., 100a) responsive to the determination that the one of the state performance metrics violates the rule. As will be explained in further detail below, the application operation controller 114 may include a generator 116 that generates contextual cues that indicate a root cause of the problem experienced by the application 104, and/or an operational command generator 118 that generates a command to control operation of the application 104 and/or the plug-in 105.

The rules generator 130 can modify the rules over time based on analysis of the state performance metrics reported over such time by the user terminals 100a-100n from measurements during particular operational states of the application 104. Thus, for example, a threshold value for an acceptable response latency observed from run-time tests of early released version(s) of the application 104 can be subsequently modified responsive to state performance metrics reported over time by the user terminals 100a-100n for the response latencies measuring during operation of a particular operational state of subsequent released version(s) of the application 104. Continuing measurements of the application 104 can thereby be used to adapt what values and/or logical conditions the rules define to be acceptable boundaries for performance of identified ones of the application operational states.

Figure 2:
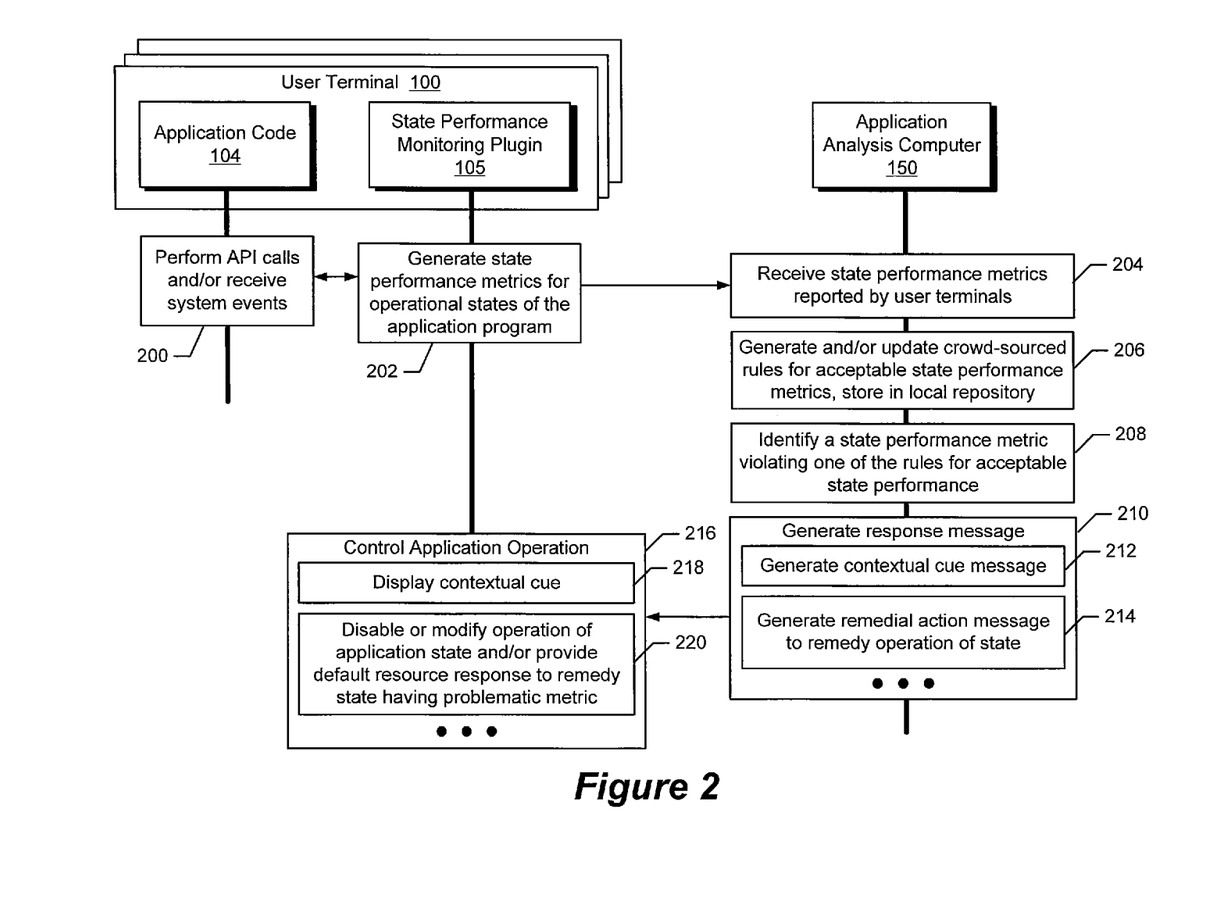
FIG. 2 is a combined data flow diagram and flowchart of operations by a user terminal and an application analysis computer for generating rules for acceptable state performance metrics from an application and providing contextual insights and/or controlling operation based on the rules, in accordance with some embodiments of the present disclosure.

FIG. 2 is a combined data flow diagram and flowchart of operations by a user terminal 100 and an application analysis computer 150 for generating crowd-sourced based rules for acceptable state performance metrics from an application and providing contextual insights and/or controlling operation based on the rules, in accordance with some embodiments of the present disclosure.

Referring to FIG. 2, the application 104 while processed by the user terminal 100 performs (block 200) API calls and/or receives system events. An operating system can notify the application 104 of system events associated with the application 104. A system event is an action of the system that must be handled by the application 104, such as "launch app", "OnStart", "OnStop", etc. For example, the operating system may generate a "launch app" event in response to a user tapping on an app in the user interface of the user terminal 100. System events are processed by a responsive function in the application 104. The state performance monitoring plug-in 105 may monitor (e.g., intercept) system events and determine if an action should be taken in response to the system event. For example, the plug-in 105 may record the system event, generate a notification in response to the system event, etc.

The logic of the plug-in 105 may also determine whether or not the system event should be passed along to the application 104. Accordingly, the plug-in 105 may implement logic that monitors for system events provided to the application 104. It is noted that the responsive function of the application 104 may be left in place to processes system events that are passed through to the application 104 by the plug-in 105.

For example, the operating system may generate an "onResume" event which is intercepted by the plug-in 105. If the logic in the plug-in 105 determines that the application 104 is not authorized to resume, then the plug-in 105 blocks the event by not forwarding it to the responsive function in the application 104.

The state performance monitoring plug-in 105 may also monitor (e.g., intercept) API calls by the application 104 to the operating system or other resources of the user terminal 100. The application 104 issues an API call to request services from the operating system or other resources. For example, an API call may be used to turn on or read camera/video data from a camera, to read data from storage, to display an image on a screen, to pass data to another application (e.g., to an encryption application, communication application, etc.), or to invoke any other functionality provided by the operating system.

The state performance monitoring plug-in 105 may pass the API call along to the operating system or other resource. Before the API call is passed to the operating system, the logic of the plug-in 105 may determine if any action needs to be taken in response to the API call and may also determine whether or not to pass the API call along to the operating system or other resource.

Moreover, in accordance with various embodiments, the state performance monitoring plug-in 105 generates (block 202) state performance metrics based on monitoring (e.g., intercepting) API calls by the application 104 and/or system events being provided to the application 104. Each of the state performance metrics indicates a measurement of performance of one of a plurality of operational states of the application 104 while processed by the user terminal 100. An operational state of the application can correspond to the present operational state of the application when an API call is generated by the application 104 and/or when a system event is being provided to the application 104.

The plug-in 105 can generate (block 202) the state performance metrics based on results of performing measurements of latency, wait time, processor bandwidth availability, memory space availability, network communication bandwidth availability, and/or availability of various defined resources which the application 104 seeks to access in accordance with various embodiments disclosed herein. Each of the state performance metrics indicates a measurement of performance of one of a plurality of operational states of the application 104 being processed by the user terminal 100.

For example, assume that the application 104 issues a system log API call to access a network server through a network interface of the user terminal 100 and the Internet. The plug-in 105 can intercept the API call and determine whether to allow the application 104 to access the network interface. When allowed, the plug-in 105 can monitor how long the application 104 has waited in an operational state without having receive a response from the network server, monitor a latency between sending a request to the network server and receiving a response from the network server, and/or perform other measurements as described herein. The plug-in 105 can generate a state performance metric based on the measurement(s), and communicate the state performance metric to the application analysis computer 150 through the radio access network 160 and the network 162.

The plug-in 105 can therefore include or programmatically invoke executable code that monitors and/or controls behavior of the application 104 by intercepting one or more API calls by the application 104, executes monitoring and/or control code in response to the API call, and thereafter returns control to the application 104 and/or passes the API call to the operating system or other resource for processing.

For example, in case the plug-in 105 is designed to limit access to a feature or resource on the user terminal 100 during a designate time frame the plug-in 105 may intercept an API call from the application 104 that invokes the feature and, if the API call is made outside the designated time frame, block access to the resource by preventing the API call from reaching the operating system or other resource instead of passing the API call to the operating system or other resource. API calls and other operations that can be performed by an application to obtain access to a resource of the user terminal 100 are more generally referred to as "requests" for convenience of reference. The plug-in 105 can therefore "block" access by a request from the application 104 to a resource of the user terminal 100 by preventing the request (e.g., API call) from reaching the operating system or other resource.

With continuing reference to FIG. 2, although various embodiments are described in the context of API calls, the embodiments may alternatively or additionally be used to intercept and measure system events provided by an operating system to the application 104. The state performance monitoring plug-in 105 observes or intercepts the API call, and may forward the API call to the operating system for processing. The operating system may process API call by providing the API call to or reading data from a resource of the user terminal 100, and the resource may provide a response which is intercepted and forwarded through the plug-in 105 to the application 104. The plug-in 105 generates (block 202) a state performance metric based on measurements of the wait time, response latency, and/or other operation measured for the API call is processed, and communicates the state performance metric to the application analysis computer 150. As explained above, the state performance metric indicates a measurement of performance of one of a plurality of operational states of the application 104 while processed by the user terminal 100.

The application analysis computer 150 receives (block 204) reports from the user terminals 100a-100n. The reports containing identifiers for operational states of the application 104 being processed by the user terminals 100a-100n and contain state performance metrics. Each of the state performance metrics indicates a measurement of performance for a corresponding identified one of the operational states of the application 104 being processed by one of the user terminals 100a-100n. For each of the operational states of the application 104 identified in the reports, the application analysis computer 150 generates (block 206) a rule, e.g., generates a new rule or updates an existing rule, for acceptable performance of the operational state of the application 104 based on the state performance metrics of the operational state reported by the user terminals 100a-100n. The computer 150 also stores in the repository 120 the rules associated with identifiers for corresponding ones of the operational states of the application 104.

The application analysis computer 150 determines (block 208), e.g., identifies, when one of the state performance metrics reported by one of the user terminals (e.g., 100a) violates one of the rules in the repository for acceptable operational state performance for the corresponding one of the operational states of the application 104. In one embodiment, the application analysis computer 150 determines that a state performance metric reported by the user terminal 100a violates a rule when the state performance metric indicates that the application 104 has waited a time duration that exceeds a maximum wait time defined by the rule without having received a response to the API call.

In one embodiment, the plug-in 105 generates (block 202) a state performance metric based on latency for a response to be provided to an API call by the application 104, and the application analysis computer 150 determines (block 208) that the state performance metric exceeds a defined maximum latency allowed for a response to be provided to the API call by the application 104. In another embodiment, the plug-in 105 generates (block 202) a state performance metric based on elapsed time waiting without having received a response to an API call by the application 104, and the application analysis computer 150 determines (block 208) that the state performance metric exceeds a defined maximum wait time the application 104 is to wait to receive a response to the API call.

The application analysis computer 150 generates (block 210) a response message that is communicated to the user terminal 100 responsive to the determination that the state performance metric violates the rule. The user terminal 100 receives the response message and controls (block 216) operation of the application 104 during the operational state responsive to content of the response message.

In one embodiment, responsive to the rule being violated, the application analysis computer 150 generates (block 212) and communicates to the user terminal 100 a contextual cue message containing information identifying a reason that the state performance metric reported by the user terminal 100 violates the rule for acceptable operational state performance of the application 104. The plug-in 105 receives the contextual cue message and displays (block 218) on a display device of the user terminal 100 a message generated based on content of the contextual cue message.

Figure 4:
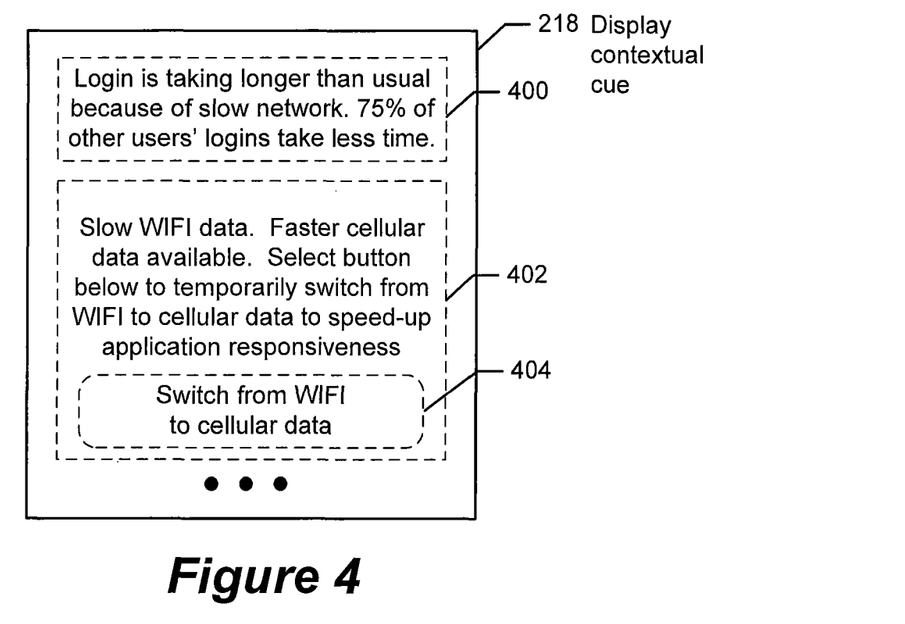
FIGS. 4 and 5 illustrated example contextual cues that can be displayed on a display device of a user terminal and associated operations in accordance with some embodiments of the present disclosure.

FIG. 4 illustrates an example contextual cue message 218 that is displayed by the plug-in 105 on a display device of the user terminal 100. The application analysis computer 150 determines based on violation of a rule that an operational state of an application login process is taking a threshold time longer than a typical observed login time, and further determines that the login delay is due to less than a threshold amount of network bandwidth being available between the user terminal 100 and a login authorization network node used by the application 104 to authenticate login credentials of the user. The computer 150 responsively generates a contextual cue message that is communicated to the user terminal 100 for display on a display device. The example contextual cue 400 displayed in region 800 of a display device explains to a user that the "login is taking longer than usual because of a slow network" and further explains that "75% of other users' logins take less time," which better informs the user about the acceptability of the present login performance.

In another embodiment, responsive to the rule being violated, the application analysis computer 150 generates (block 214) and communicates to the user terminal 100 a remedial action message. The plug-in 105 then controls (block 220) operation of the application responsive to the remedial action message.

In the further example of FIG. 4, an alternate contextual cue is displayed in region 402 by the plug-in 105, to explain to a user that the WIFI data connection is slow and a faster cellular data connection is available. Moreover, the displayed message may contain a user selectable remedial action. The illustrated user selectable remedial action is an offer to allow the user to select a soft button 404 displayed on a touch sensitive interface to temporarily switch from a WIFI data connection to a cellular data connection for communication with a networked resource in order to speed up the application responsiveness during the login process. The soft button 404 may be displayed responsive to the plug-in 105 receiving the corresponding remedial action message from the application analysis computer 150. In this manner, the plug-in 105 can display an explanation of the underlying basis for a problem experienced by the application 104 and, moreover, can provide a temporary or permanent remedy to that problem for selection by a user.

In one embodiment, the plug-in 105 is configured to temporarily switch from the WIFI data connection to the cellular data connection for use by the application during only the operational state having the problem and, thereafter, constrained the application to using the WIFI data connection. Such temporary switching may be particularly advantageous when the user incurs cellular data roaming charges, such as while traveling in foreign countries. The user may thereby selectively consider and allow such mode switching to allow expedited or further operation of an application state the user decides has sufficient value or importance to justify the consequential effect of allowing the switching.

In another embodiment, the application analysis computer 150 determines, based on the state performance metric received from the user terminal 100 violating a rule defined for the operational state, that the plug-in 105 is likely the root cause of an operational problem with the application operational state because the plug-in 105 is blocking an API call from the application 104 to a resource of the user terminal 100 that is necessary for operation of the operational state. The computer 150 responsively generates (block 214) the remedial action message to contain a command to disable interception by the plug-in 105 of the API call and/or other API calls from the application 104 during the operational state identified by the identifier in the message from the user terminal 100 containing the state performance metric. Responsive to the command, the plug-in 105 disables or modifies (block 220) its operations to intercept the API call and/or other API calls from the application 104 during the one of the operational states identified by the identifier received in the remedial action message.

In another embodiment, the application analysis computer 150 determines, based on the state performance metric received from the user terminal 100 violating a rule defined for the operational state, that the application operational state is having a problem because a resource of the user terminal 100 is presently unavailable to be accessed by the application 104 via, for example, an API call. The computer 150 may furthermore determine based on the state performance metric whether the access is due to a user-defined permission preventing access to the resource by the application 104, due to the plug-in 105 blocking access to the resource, due to the processor of the user terminal 100 having insufficient processing bandwidth to allow timely access to the resource, due to the network connection to the resource being unavailable or having insufficient bandwidth, etc. The computer 150 responsively communicates (block 214) to the plug-in 105 a response message (e.g., a remedial action message) containing a defined value that the plug-in 105 is to provide to the application 104. The defined value imitates an acceptable response to the application 104 from the API call to the resource.

The plug-in 105 receives the response message and responsively provides (block 220) the defined value to the application 104 as the acceptable response from the API call to the resource. Thus, although during the operational state the application 104 is unable to access a necessary resource, the application analysis computer 150 operates in cooperation with the plug-in 105 to provide a defined value to the application 104 that appears to have come from the resource and which is known, based on the rule, to be an acceptable response to the application 104. In one embodiment, the defined value is determined and stored in the repository 120 during generation of the rules, and may be updated over time based on values that are observed to be provided by the subject resource during run-time operation of the wrapped application.

Figure 5:
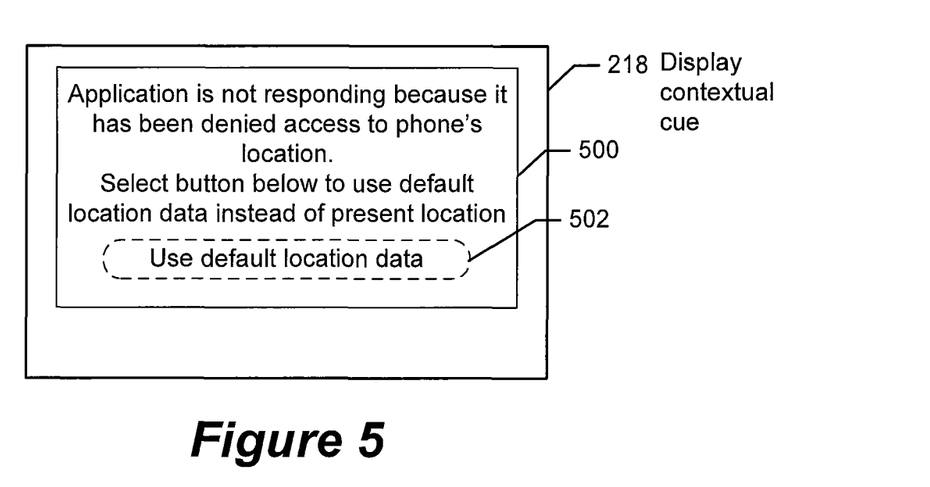

FIG. 5 illustrates another example contextual cue message 218 that is displayed on a display device of the user terminal 100. The application analysis computer 150 determines (block 208) based on violation of a rule that the application 104 is not responding to the user because the application 104 has been denied access to the user terminal's (phone's) present location, e.g., because no GPS data is available from a GPS resource and/or a user-defined permission has denied the application's 104 requested access to a location service of the user terminal 100. The computer 150 responsively generates (block 212) a contextual cue that is communicated to the user terminal 100 for display. The plug-in 105 on the user terminal 100 displays a message 500 explaining the underlying basis for the application problem and displays a soft button 502 on a touch sensitive interface. The soft button 502, when selected by the user, causes the plug-in 105 to provide default location data to the application 104 to imitate a response being provided from the location service that is presently unavailable to the application 104.

In this manner, the plug-in 105 can display an explanation of the underlying basis for a problem experienced by the application 104 and, moreover, allows the user to remedy the problem by providing an acceptable response to the application on behalf of the unavailable resource to cause the application to continue processing without further delay or error. In one embodiment, the default location data is determined and stored in the repository 120 during generation of the rules. In another embodiment, the default location data is determined by the user terminal 100 and/or by the application analysis computer 150 based on one or more default location data responses from the GPS resource to one or more access requests by the application 104 or more generally by the user terminal 100.

Various embodiments have been described in the context of the application analysis computer 150 identifying (block 208) that a state performance metric violates a rule and responsively generating (block 216) the response message. However, in some other embodiments the user terminal 100 performs operations to identify that a state performance metric violates a rule and operations to generate a response message that controls operation of the plug-in 105 in the application 104, and which may be performed in addition to or as an alternative to these operations being performed by the application analysis computer 150.

Figure 3:
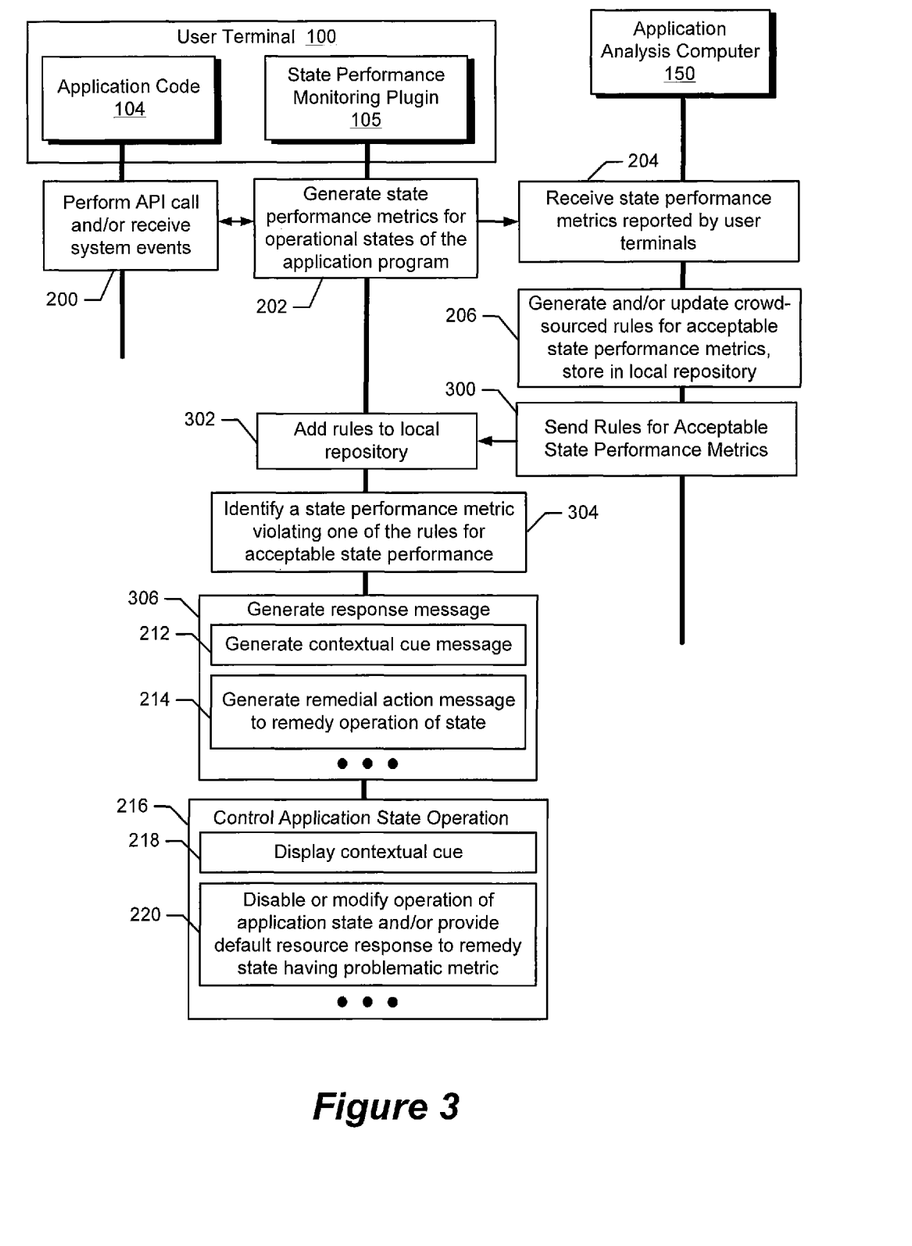
FIG. 3 is a combined data flow diagram and flowchart of operations by a user terminal for generating rules for acceptable state performance metrics from an application and providing contextual insights and/or controlling operation based on the rules, in accordance with some embodiments of the present disclosure.

FIG. 3 is a combined data flow diagram and flowchart of operations by the user terminal 100 for generating rules for acceptable state performance metrics from the plug-in 105 and providing contextual insights and/or controlling operation based on the rules, in accordance with some embodiments of the present disclosure. Some of the operations shown in FIG. 3 may be performed as described above regarding the blocks shown in FIG. 2 having the same reference numbers. The description of blocks having the same reference numbers as FIG. 2 is not repeated here for sake of brevity.

Referring to FIG. 3, the application analysis computer 150 sends (block 300) rules for acceptable state performance metrics to the user terminal 100. The plug-in 105 receives the rules for acceptable state performance metrics and adds (block 302) the rules to a local repository within the user terminal 100. The application 104 can perform (block 200) API calls to resources of the user terminal 100 and the plug-in 105 can intercept or otherwise observe the API calls, and generate (block 202) state performance metrics based on measurements perform relative to the API calls. The plug-in 105 can similarly intercept system events provided by the operating system to the application 104, and generate (block 202) state performance metrics based on measurements perform relative to the system events. The plug-in 105 identifies (block 304) a state performance metric that violates one of the rules for acceptable state performance. The plug-in 105 responsively generates (block 306) a response message, which may include generating (block 212) a contextual cue message and/or generating (block 214) a remedial action message to remedy problematic operation of an application state.

The plug-in 105 controls (block 216) its operation and can further control operation of the application 104 by displaying (block 218) a contextual cue on display device and/or by disabling or modify (block 220) operation of the plug-in 105 and/or disabling or modifying an application state to remedy the state having the problematic state performance metric. The control operation can include providing a default resource response to the application 104 when the resource is not presently available to be accessed by the application 104.

Figure 6:
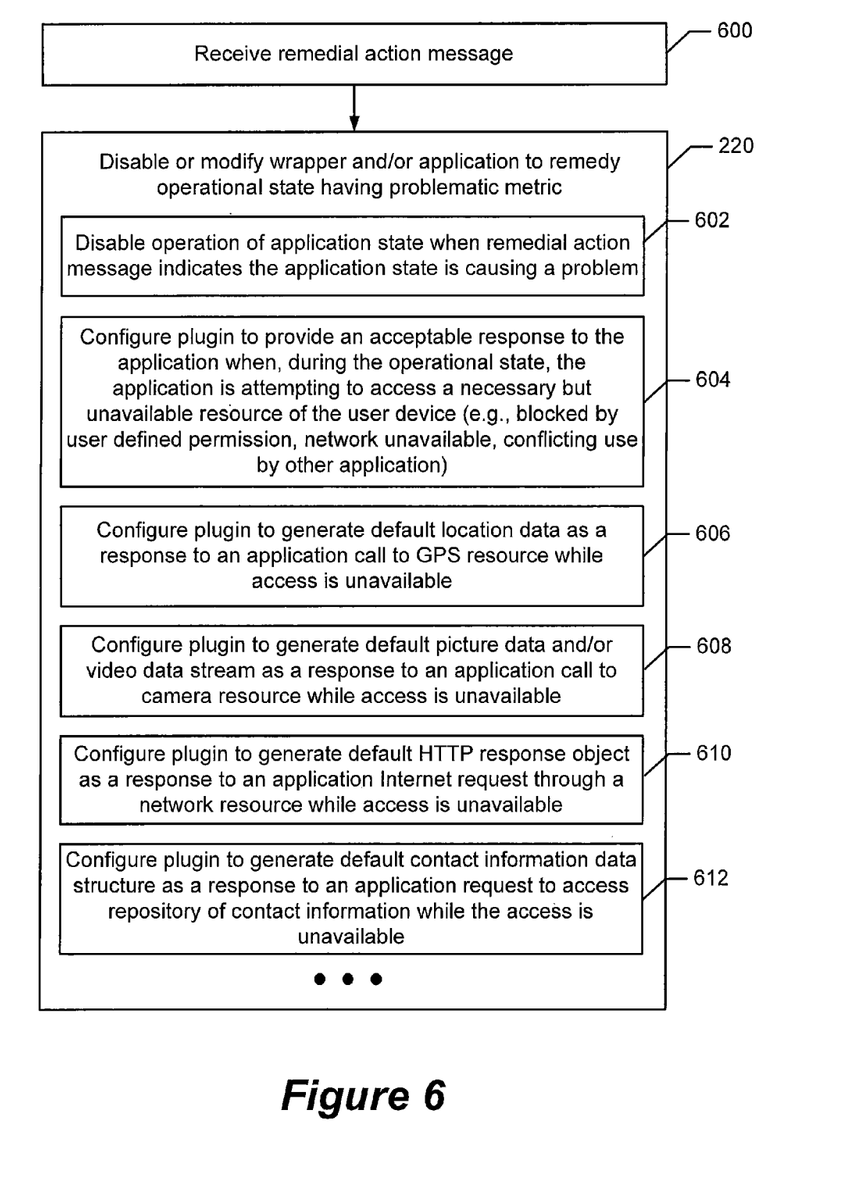
FIG. 6 is a flowchart of operations that can be performed by a user terminal and/or by an application analysis computer responsive to state performance metrics in accordance with some embodiments of the present disclosure.

FIG. 6 is a flowchart of further operations that can be performed by the user terminal 100 to remedy a problematic operational state of an application due to unavailability of a resource in accordance with some embodiments of the present disclosure. Referring to FIG. 6, a remedial action message is received (block 600) which causes disabling or modification (block 220) of operation of a feature of the plug-in 105 and/or an operational state of the application 104 associated with the problematic state performance metric. One or more of the illustrated operations can be performed to carry out the disabling or modification (block 220).

In one embodiment, the plug-in 105 receives a remedial action message containing a command and the identifier for the one of the operational states, where the command indicates that a resource that the application 104 is attempting to access is unavailable to the application 104. Responsive to the command, the plug-in 105 controls (block 602) operation of the application 104 to disable the application 104 from seeking access to the resource during the one of the operational states identified by the identifier received in the remedial action message.

For example, developers typically code an application program to operate based on the assumption that if during setup of the application a set of permissions is granted (e.g., based on user defined preferences or selections) for the application to access corresponding resources of user devices, then the application will have access to those resources whenever requested by the application. However, the application 104 can be controlled by the plug-in 105 written by an entirely different entity, and the plug-in 105 can exert unexpected control over those access requests. The plug-in 105 can block a request from a feature of the application 104 to access a particular resource when an access control rule used by the plug-in 105 is satisfied. Such blocking of resource access can trigger unexpected operational behavior from the application 104 and result in erroneous operation during the access operational state. The erroneous operation can include ceasing further operations while hanging in an infinite loop or wait state while awaiting a requested response from the resource. Another erroneous operation can include terminating operation due to a mathematical error from processing a register value or memory value that is erroneously interpreted as a valid response from the requested resource. Still another erroneous operation can include causing a change in a conditional branch (e.g., the blocked access erroneously affects the branch condition) during processing of operations of the application program due to absence of a response from the requested resource. One or more of these problems can be overcome by the plug-in 105 controlling (block 602) operation of the application 104 to disable the application 104 from seeking access to the resource during the one of the operational states identified by the identifier received in the remedial action message, when the remedial action message indicates that the resource is presently unavailable to the application 104.

In another embodiment, the plug-in 105 responds to the remedial action message by providing (block 604) an acceptable response to the application 104 when, during the operational state, the application 104 is attempting to access a necessary but unavailable resource of the user device 100. As explained above, the resource may be unavailable due to, for example, access to the resource being blocked by a user defined permission setting, unavailability or insufficient availability of network communications between the user terminal 100 and a network node hosting the resource, conflicting use of the resource by another application processed by the user terminal 100, etc.

In another embodiment, the plug-in 105 generates (block 606) default location data as a response to an application call to a GPS resource while access to the GPS resource is blocked or otherwise unavailable. For example, a restaurant locator application assumes that the device's location from a GPS resource is available all of the time or, if it is turned-off, the application 104 is notified of that status and configured to then prompt the user to turn-on the GPS resource. However the plug-in 105 can dynamically control whether the application 104 is allowed access to the GPS resource or the application 104 may not be programmed to properly handle occurrence of other conditions that can prevent necessary access to the GPS resource. When a request from the application 104 to the GPS resource is blocked by the plug-in 105 or that a GPS resource is otherwise unavailable, the application 104 can exhibit erroneous operation. In accordance with this embodiment, the plug-in 105 provides (block 604) the default location data as a response to an application call to a GPS resource while access to the GPS resource is blocked or otherwise unavailable. The default location may be defined by a user (e.g., such as a work address that the user doesn't mind sharing) or may be based on a previous location that was recorded while access to the GPS resource was available, such as a location reported by the GPS resource responsive to a previous request from the application 104.

In another embodiment, the plug-in 105 generates (block 608) default picture data and/or video stream data as a response to the application 104 API call to a camera resource while access to the camera resource is blocked or otherwise unavailable. Thus, for example, a photo capture or editing application may always expect that the user terminal's camera resource to be available for its operations. However the plug-in 105 can dynamically control whether the application 104 is allowed access to the camera resource and/or the camera resource may be unavailable for other reasons. When a request from the application 104 to the camera resource is blocked or otherwise unavailable, the application 104 can exhibit erroneous operation (e.g., triggering an operating system of the user device 100 to force shutdown due to erroneous application operation). In accordance with this embodiment, the plug-in 105 provides (block 608) the default picture data and/or video stream data as a response to the application 104 while access to the camera resource is blocked or otherwise unavailable. The default picture data and/or video data stream may be defined by the user and/or may be based on previous picture data and/or video data stream that was recorded while access to the camera resource was available, such as picture data and/or video data stream received from the camera resource responsive to a previous request from the application 104.

In another embodiment, the plug-in 105 generates (block 610) a default HTTP response object as a response to an application Internet request through a network resource while access to the network resource is blocked or otherwise unavailable. In another embodiment, the plug-in 105 generates (block 612) a default contact information data structure as a response to a request from the application 104 to access a repository of contact information while such access is blocked or otherwise unavailable.

Accordingly, one or more of the operations of block 220 can be performed to configure the plug-in 105 to provide an acceptable response to the application 104 on behalf of the resource that is presently unavailable to the application 104. The default response or other generated response to the application 104 can enable the application 104 to continue processing through the present application state or subsequent application states without further problem.

Figure 7:
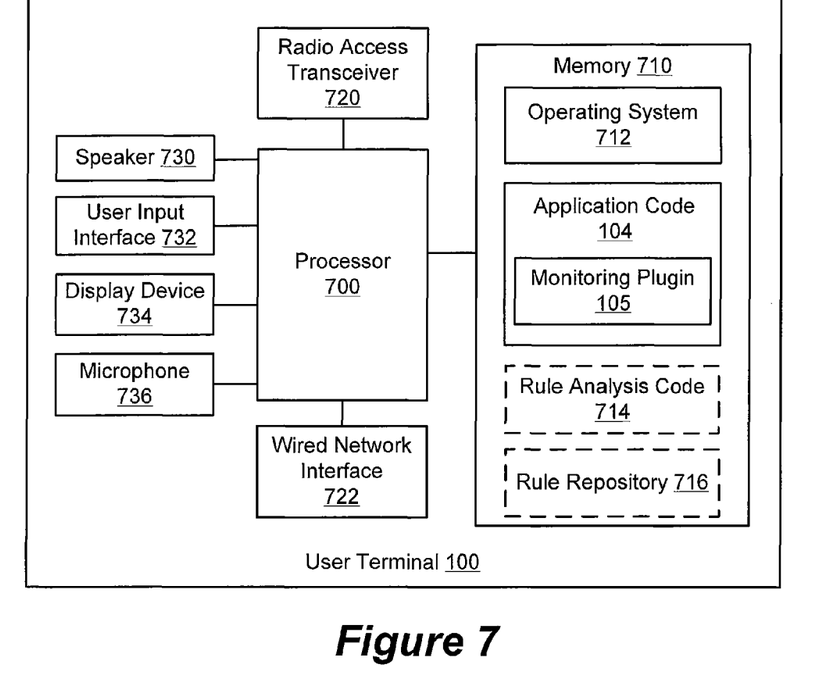
FIG. 7 is a block diagram of a user terminal configured according to some embodiments of the present disclosure.

FIG. 7 is a block diagram of a user terminal 100 configured according to some embodiments of the present disclosure. Referring to FIG. 1, the mobile terminal 100 includes a processor 700, a memory 710 and a network interface which may include a radio access transceiver 720 and/or a wired network interface 722 (e.g., Ethernet interface). The radio access transceiver 720 can include, but is not limited to, a LTE or other cellular transceiver, WLAN transceiver (IEEE 802.11), WiMax transceiver, or other radio communication transceiver configured to communicate with the application analysis computer 150 via a radio access network.

The processor 700 may include one or more data processing circuits, such as a general purpose and/or special purpose processor, such as a microprocessor and/or digital signal processor. The processor 700 is configured to execute computer program code in the memory 710, described below as a non-transitory computer readable medium, to perform at least some of the operations described herein as being performed by a user terminal. The computer program code may include an operating system 712, and an application program 104 that includes a state performance monitoring plug-in 105. In some further embodiments, the computer program code includes a rule repository 716 and rule analysis code 714. The plug-in 105 generates state performance metrics based on measurements performed during operational states of the application 104. The rule repository 716 can include, for each of the operational states of the application 104, a rule for acceptable performance of the operational state of the application 104 relative to a state performance metric. The rule analysis code 714 can determine when one of the state performance metrics that is generated by the plug-in 105 violates one of the rules in the repository 716 for acceptable operational state performance for the corresponding one of the operational states of the application 104. The user terminal 100 may further include a speaker 730, user input interface 732 (e.g., touch screen, keyboard, keypad, etc.), a display device 734, and a microphone 736.

As used herein, the term "user terminal" may include, without limitation, a satellite or cellular radiotelephone; a PDA or smart phone that can include a radiotelephone, pager, Internet/intranet access, Web browser, organizer, calendar and/or a global positioning system (GPS) receiver; and a tablet computer, laptop computer, desktop computer that includes a network interface allowing communication with an application analysis computer via a data network (e.g., private network and/or a public network such as the Internet).

Figure 8:
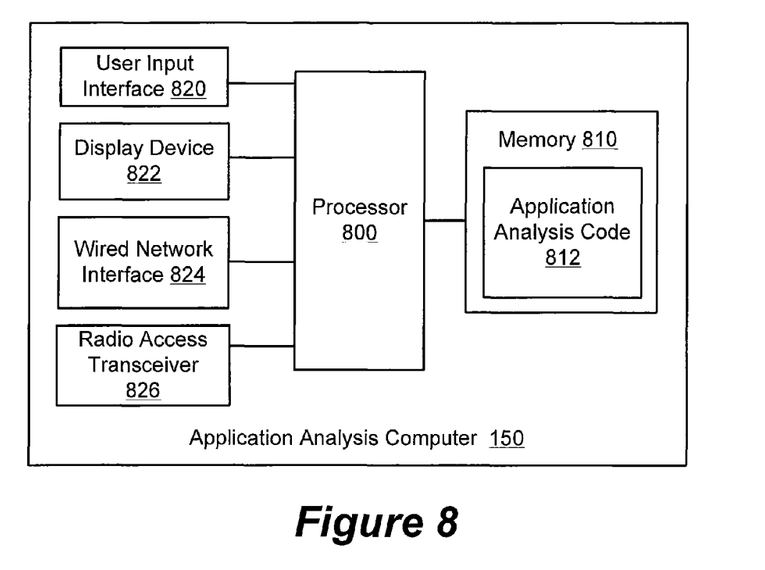
FIG. 8 is a block diagram of an application analysis computer configured according to some embodiments of the present disclosure.

FIG. 8 is a block diagram of an application analysis computer 150 configured according to some embodiments of the present disclosure. The application analysis computer 150 includes a processor 800, a memory 810, and a network interface which may include a radio access transceiver 826 and/or a wired network interface 824 (e.g., Ethernet interface). The radio access transceiver 826 can include, but is not limited to, a LTE or other cellular transceiver, WLAN transceiver (IEEE 802.11), WiMax transceiver, or other radio communication transceiver configured to communicate with the user terminal 100 via a radio access network.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein as being performed by an application analysis computer. The computer program code may include application analysis code 812 configured to receive and process state performance metrics in accordance with one or more embodiments herein. The application analysis computer 150 may further include a user input interface 820 (e.g., touch screen, keyboard, keypad, etc.) and a display device 822.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
   performing operations as follows on a processor of an application analysis computer:
   receiving reports from user terminals containing identifiers for operational states of an application being processed by the user terminals and containing state performance metrics, each of the state performance metrics indicating a measurement of performance for a corresponding identified one of the operational states of the application being processed by one of the user terminals;
   for each of the operational states of the application identified in the reports, generating a rule for acceptable performance of the operational state of the application based on the state performance metrics of the operational state reported by the user terminals;
   storing in a repository the rules associated with identifiers for corresponding ones of the operational states of the application;
   determining when one of the state performance metrics reported by one of the user terminals violates one of the rules in the repository for acceptable operational state performance for the corresponding one of the operational states of the application; and
   communicating a response message to the one of the user terminals responsive to the determination that the one of the state performance metrics violates one of the rules in the repository, wherein the communication of the response message comprises communicating to the one of the user terminals a remedial action message containing a defined value for the application to use as an acceptable response to an application programming interface (API) call to a resource of the one of the user terminal when the resource is not available to provide a response to the API call.

2. The method of claim 1, wherein the, for each of the operational states of the application identified in the reports, generating a rule for acceptable performance of the operational state of the application based on the state performance metrics of the operational state reported by the user terminals, comprises:
   mathematically combining the performance metrics for the operational state to generate a threshold value representing a boundary limit for acceptable performance of the operational state.

3. The method of claim 2, wherein:
   the threshold value represents a maximum wait time the application is to wait to receive a response to an application programming interface call by the application; and
   the determining when one of the state performance metrics reported by one of the user terminals violates one of the rules in the repository for acceptable operational state performance for the corresponding one of the operational states of the application, comprises:
   determining when the one of the state performance metrics reported by the one of the user terminals exceeds the maximum wait time.

4. The method of claim 1, wherein:
   the determining when one of the state performance metrics reported by one of the user terminals violates one of the rules in the repository for acceptable operational state performance for the corresponding one of the operational states of the application, comprises:
   retrieving the rule from the repository using the identifier contained in the one of the reports corresponding to the one of the state performance metrics in one of the reports.

5. The method of claim 1, wherein the communicating a response message to the one of the user terminals responsive to the determination that the one of the state performance metrics violates one of the rules in the repository, further comprises:
   communicating to the one of the user terminals a contextual cue message containing information identifying a reason that the one of the state performance metrics reported by the one of the user terminals violates the rule for acceptable operational state performance of the application.

6. The method of claim 1, further comprising:
   communicating the rules from the repository with identifiers for corresponding ones of the operational states of the application to the user terminals for their local determination of when one of the state performance metrics determined by one of the user terminals violates one of the rules for acceptable operational state performance for the corresponding one of the operational states of the application.

7. A method, comprising:
   performing operations as follows on a processor of a user terminal:
   generating state performance metrics, each of the state performance metrics indicating a measurement of performance of one of a plurality of operational states of an application processed by the user terminal;
   communicating the state performance metrics to an application analysis computer via a data network;
   determining an action responsive to one of the state performance metrics for one of the operational states being determined to violate a rule for acceptable operational state performance of the application, wherein the determining comprises:
   receiving a response message from the application analysis computer responsive to the one of the state performance metrics for the one of the operational states being determined by the application analysis computer to violate the rule for acceptable operational state performance of the application, and determining a defined value based on the response message; and
   determining the action based on content of the response message; and
   controlling operation of the application during the one of the operational states responsive to the action, wherein the controlling operation comprises:
   responsive to the remedial action message, providing the defined value to the application to use as an acceptable response to an application programming interface (API) call to a resource of the user terminal when the resource is not available to provide a response to the API call, wherein the providing the defined value to the application, comprises:
    determining a default location based on the response message; and
    providing the default location as a response to the API call to a GPS resource of the user terminal absent having received a present location from the GPS resource.

8. The method of claim 7, wherein the controlling operation of the application during the one of the operational states responsive to the action, comprises:
    generating a contextual cue message based on content of the response message, the contextual cue message identifying a reason that the one of the state performance metrics reported by one of the user terminals violates the rule for acceptable operational state performance of the application
    displaying the contextual cue message through a display device of the user terminal.

9. The method of claim 7, wherein the determining an action responsive to one of the state performance metrics for one of the operational states being determined to violate a rule for acceptable operational state performance of the application, comprises:
    selecting the rule for acceptable operational state performance of the application from among a plurality of rules contained in a repository based on the one of a plurality of operational states for which the one of the state performance metrics was generated;
    comparing the one of the state performance metrics to the rule that was selected to determine that the one of the state performance metrics violates the rule for acceptable operational state performance of the application;
    determining the action based on the rule that is determined to be violated.

10. The method of claim 9, wherein:
    the generating state performance metrics, each of the state performance metrics indicating a measurement of performance of one of a plurality of operational states of an application processed by the user terminal, comprises:
        generating the state performance metrics based on latency for a response to be provided to an application programming interface call by the application;
    the comparing the one of the state performance metrics to the rule that was selected to determine that the one of the state performance metrics violates the rule for acceptable operational state performance of the application, comprises:
        determining that the one of the state performance metrics exceeds a defined maximum latency allowed for a response to be provided to the application programming interface call by the application.

11. The method of claim 9, wherein:
    the generating state performance metrics, each of the state performance metrics indicating a measurement of performance of one of a plurality of operational states of an application processed by the user terminal, comprises:
        generating the state performance metrics based on elapsed time waiting without having received a response to an application programming interface call by the application;
    the comparing the one of the state performance metrics to the rule that was selected to determine that the one of the state performance metrics violates the rule for acceptable operational state performance of the application, comprises:
        determining that the one of the state performance metrics exceeds a defined maximum wait time the application is to wait to receive a response to the application programming interface call.

12. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
receiving a response message from the application analysis computer responsive to one of the state performance metrics for one of the operational states being determined by the application analysis computer to violate a rule for acceptable operational state performance of the application;
determining an action based on content of the response message; and
controlling operation of the application during the one of the operational states responsive to the action,
wherein the communicating the state performance metrics to the application analysis computer via a data network, comprises:
    communicating messages to the application analysis computer, each of the messages containing an identifier for one of the operational states of the application and a state performance metric for the one of the operational states;
wherein the receiving a response message from the application analysis computer, comprises:
    receiving a remedial action message containing a command and the identifier for the one of the operational states, wherein the command indicates that a resource that the application is attempting to access is unavailable to the application, and
wherein the controlling operation of the application during the one of the operational states responsive to the action, comprises:
    responsive to the command, controlling the application to disable the application from seeking access to the resource during the one of the operational states identified by the identifier received in the remedial action message.

13. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
determining an action responsive to one of the state performance metrics for one of the operational states being determined to violate a rule for acceptable operational state performance of the application, wherein the determining comprises:
    receiving a response message from the application analysis computer responsive to the one of the state performance metrics for the one of the operational states being determined by the application analysis computer to violate the rule for acceptable operational state performance of the application, and determining a defined value based on the response message; and determining the action based on content of the response message; and controlling operation of the application during the one of the operational states responsive to the action, wherein the controlling operation comprises:

responsive to the remedial action message, providing the defined value to the application to use as an acceptable response to an application programming interface (API) call to a resource of the user terminal when the resource is not available to provide a response to the API call, wherein the providing the defined value to the application, comprises:

determining a default HTTP response object based on the response message; and providing the default HTTP response object as a response from a network node via Internet to the API call by the application absent having received a HTTP response object from the network node.

14. The method of claim 13, wherein the determining an action responsive to one of the state performance metrics for one of the operational states being determined to violate a rule for acceptable operational state performance of the application, comprises:

selecting the rule for acceptable operational state performance of the application from among a plurality of rules contained in a repository based on the one of a plurality of operational states for which the one of the state performance metrics was generated;

comparing the one of the state performance metrics to the rule that was selected to determine that the one of the state performance metrics violates the rule for acceptable operational state performance of the application;

determining the action based on the rule that is determined to be violated.

15. The method of claim 13, wherein the, for each of the operational states of the application identified in the reports, generating a rule for acceptable performance of the operational state of the application based on the state performance metrics of the operational state reported by the user terminals, comprises:

mathematically combining the performance metrics for the operational state to generate a threshold value representing a boundary limit for acceptable performance of the operational state.

16. The method of claim 15, wherein:

the threshold value represents a maximum wait time the application is to wait to receive a response to an application programming interface call by the application; and the determining when one of the state performance metrics reported by one of the user terminals violates one of the rules in the repository for acceptable operational state performance for the corresponding one of the operational states of the application, comprises:

determining when the one of the state performance metrics reported by the one of the user terminals exceeds the maximum wait time.

17. The method of claim 13, wherein:

the determining when one of the state performance metrics reported by one of the user terminals violates one of the rules in the repository for acceptable operational state performance for the corresponding one of the operational states of the application, comprises:

retrieving the rule from the repository using the identifier contained in the one of the reports corresponding to the one of the state performance metrics in one of the reports.

18. A method, comprising:

performing operations as follows on a processor of a user terminal:

generating state performance metrics, each of the state performance metrics indicating a measurement of performance of one of a plurality of operational states of an application processed by the user terminal;

communicating the state performance metrics to an application analysis computer via a data network;

determining an action responsive to one of the state performance metrics for one of the operational states being determined to violate a rule for acceptable operational state performance of the application, wherein the determining comprises:

receiving a response message from the application analysis computer responsive to the one of the state performance metrics for the one of the operational states being determined by the application analysis computer to violate the rule for acceptable operational state performance of the application, and determining a defined value based on the response message; and determining the action based on content of the response message; and controlling operation of the application during the one of the operational states responsive to the action, wherein the controlling operation comprises:

responsive to the remedial action message, providing the defined value to the application to use as an acceptable response to an application programming interface (API) call to a resource of the user terminal when the resource is not available to provide a response to the API call, wherein the providing the defined value to the application, comprises:

determining default camera data based on the response message; and providing the default camera data as a response from a camera of the user terminal to the API call by the application absent having received camera data from the camera.

19. The method of claim 18, wherein the determining an action responsive to one of the state performance metrics for one of the operational states being determined to violate a rule for acceptable operational state performance of the application, comprises:

selecting the rule for acceptable operational state performance of the application from among a plurality of rules contained in a repository based on the one of a plurality of operational states for which the one of the state performance metrics was generated;

comparing the one of the state performance metrics to the rule that was selected to determine that the one of the state performance metrics violates the rule for acceptable operational state performance of the application;

determining the action based on the rule that is determined to be violated.

20. The method of claim 18, wherein the, for each of the operational states of the application identified in the reports, generating a rule for acceptable performance of the operational state of the application based on the state performance metrics of the operational state reported by the user terminals, comprises:

mathematically combining the performance metrics for the operational state to generate a threshold value representing a boundary limit for acceptable performance of the operational state.

* * * * *